(12) United States Patent
Iwata et al.

(10) Patent No.: US 11,995,398 B2
(45) Date of Patent: May 28, 2024

(54) DICTIONARY EDITING APPARATUS, DICTIONARY EDITING METHOD, AND RECORDING MEDIUM RECORDING THEREON DICTIONARY EDITING PROGRAM

(71) Applicant: KABUSHIKI KAISHA TOSHIBA, Tokyo (JP)

(72) Inventors: Kenji Iwata, Tokyo (JP); Takehiko Kagoshima, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 370 days.

(21) Appl. No.: 17/446,092

(22) Filed: Aug. 26, 2021

(65) Prior Publication Data

US 2022/0138416 A1 May 5, 2022

(30) Foreign Application Priority Data

Nov. 5, 2020 (JP) ................... 2020-185249

(51) Int. Cl.
*G06F 40/242* (2020.01)
*G06F 40/289* (2020.01)

(52) U.S. Cl.
CPC .......... *G06F 40/242* (2020.01); *G06F 40/289* (2020.01)

(58) Field of Classification Search
CPC .............................. G06F 40/242; G06F 40/289
See application file for complete search history.

(56) References Cited

U.S. PATENT DOCUMENTS

| | | | |
|---|---|---|---|
| 6,804,645 B1 | 10/2004 | Kleinschmidt | |
| 7,437,296 B2 | 10/2008 | Inoue et al. | |
| 8,346,537 B2 | 1/2013 | Chino et al. | |
| 8,364,493 B2 | 1/2013 | Yano | |
| 8,538,745 B2 | 9/2013 | Toyoshima et al. | |
| 9,471,568 B2 | 10/2016 | Kamatani et al. | |
| 9,947,313 B2 | 4/2018 | Drewes | |
| 10,311,873 B2 | 6/2019 | Kume et al. | |
| 2002/0138265 A1 | 9/2002 | Stevens et al. | |
| 2004/0123248 A1* | 6/2004 | Ishikura | ................ G06F 40/289 715/256 |
| 2004/0181391 A1 | 9/2004 | Inoue et al. | |

(Continued)

FOREIGN PATENT DOCUMENTS

JP 2010157178 A 7/2010

OTHER PUBLICATIONS

Office Action (Final Rejection) dated Feb. 2, 2023, issued in related U.S. Appl. No. 17/412,437.
Office Action dated Aug. 3, 2023, issued in related U.S. Appl. No. 17/412,437.
Non-Final Office Action dated Aug. 26, 2022, issued in related U.S. Appl. No. 17/412,437.

(Continued)

*Primary Examiner* — Ibrahim Siddo
(74) *Attorney, Agent, or Firm* — Holtz, Holtz & Volek PC

(57) ABSTRACT

According to one embodiment, a dictionary editing apparatus includes a processor with hardware. The processor extracts a word from text data. The processor appends a character pronunciation to the extracted word. The processor calculates at least one of a first reliability denoting a reliability of the extracted word and a second reliability denoting a reliability of the appended character pronunciation. The processor specifies a word to be a modification candidate in accordance with the first reliability. The processor specifies a character pronunciation to be a modification candidate in accordance with the second reliability.

7 Claims, 3 Drawing Sheets

(56) References Cited

U.S. PATENT DOCUMENTS

| | | |
|---|---|---|
| 2004/0205671 A1 | 10/2004 | Sukehiro et al. |
| 2005/0203751 A1 | 9/2005 | Stevens et al. |
| 2006/0106604 A1 | 5/2006 | Okimoto |
| 2007/0239455 A1 | 10/2007 | Groble et al. |
| 2009/0024392 A1* | 1/2009 | Koshinaka .............. G10L 15/18 704/E15.044 |
| 2010/0174528 A1 | 7/2010 | Oya et al. |
| 2011/0301950 A1 | 12/2011 | Ouchi et al. |
| 2015/0081270 A1 | 3/2015 | Kamatani et al. |
| 2015/0127326 A1 | 5/2015 | Hecht et al. |
| 2016/0275942 A1 | 9/2016 | Drewes |
| 2017/0133007 A1 | 5/2017 | Drewes |
| 2017/0262427 A1 | 9/2017 | Shimamura |
| 2018/0090145 A1 | 3/2018 | Kume et al. |
| 2020/0184958 A1* | 6/2020 | Norouzi ................. G09B 19/04 |
| 2022/0138416 A1 | 5/2022 | Iwata et al. |

OTHER PUBLICATIONS

Lane, et al., "Class-based Statistical Machine Translation for Field Maintainable Speech-To-Speech Translation", Mobile Technologies LLC, 2008, pp. 2362-2365.

Merialdo, "Speech recognition with very large size dictionary", IEEE International Conference on Acoustics, Speech, and Signal Processing, 1987, pp. 364-367.

Stahlberg, et al., "Towards Automatic Speech Recognition Without Pronunciation Dictionary, Transcribed Speech and Text w Resources in the Target Language Using Cross-Lingual Word-To-Phoneme Alignment", 2014, 8 pages.

Related U.S. Appl. No. 17/412,437, First Named Inventor: Kenji Iwata; Title: "Dictionary Editing Apparatus and Dictionary Editing Method", filed Aug. 26, 2021.

\* cited by examiner

DICTIONARY EDITING APPARATUS, DICTIONARY EDITING METHOD, AND RECORDING MEDIUM RECORDING THEREON DICTIONARY EDITING PROGRAM

CROSS-REFERENCE TO RELATED APPLICATIONS

This application is based upon and claims the benefit of priority from the Japanese Patent Application No. 2020-185249, filed Nov. 5, 2020, the entire contents of which are incorporated herein by reference.

FIELD

Embodiments described herein relate generally to a dictionary editing apparatus, a dictionary editing method, and a recording medium recording thereon a dictionary editing program.

BACKGROUND

In speech recognition technology, for improvements to be made in the precision of speech recognition, it is important to register, in advance, in a speech recognition dictionary used in a speech recognition engine, both technical terms often uttered in settings where speech recognition is actually utilized and words that are unknown to said engine. However, it is difficult to manually list such technical terms and unknown words and add character pronunciation to them.

On the other hand, if the speech recognition engine were provided with a function of reading text data related to a setting where speech recognition is utilized (e.g. in the case of recognizing speech in a university class, lecture material), automatically extracting technical terms and unknown words, and automatically appending pronunciations to the extracted technical terms and unknown words, the registration itself of the technical terms and the unknown words in a dictionary would be easy. However, there is a possibility that the automatically extracted technical terms and unknown words and the automatically appended character pronunciations would be incorrect. Accordingly, it is necessary to manually perform a final check of the registered technical terms and unknown words and their character pronunciations. In this case, if the number of candidates for the extracted technical terms and unknown words were large, it would be difficult to check all of them manually.

DETAILED DESCRIPTION

In general, according to one embodiment, a dictionary editing apparatus includes a processor with hardware. The processor extracts a word from text data. The processor appends a character pronunciation to the extracted word. The processor calculates at least one of a first reliability denoting a reliability of the extracted word and a second reliability denoting a reliability of the appended character pronunciation. The processor specifies a word to be a modification candidate in accordance with the first reliability. The processor specifies a character pronunciation to be a modification candidate in accordance with the second reliability.

Figure 1:
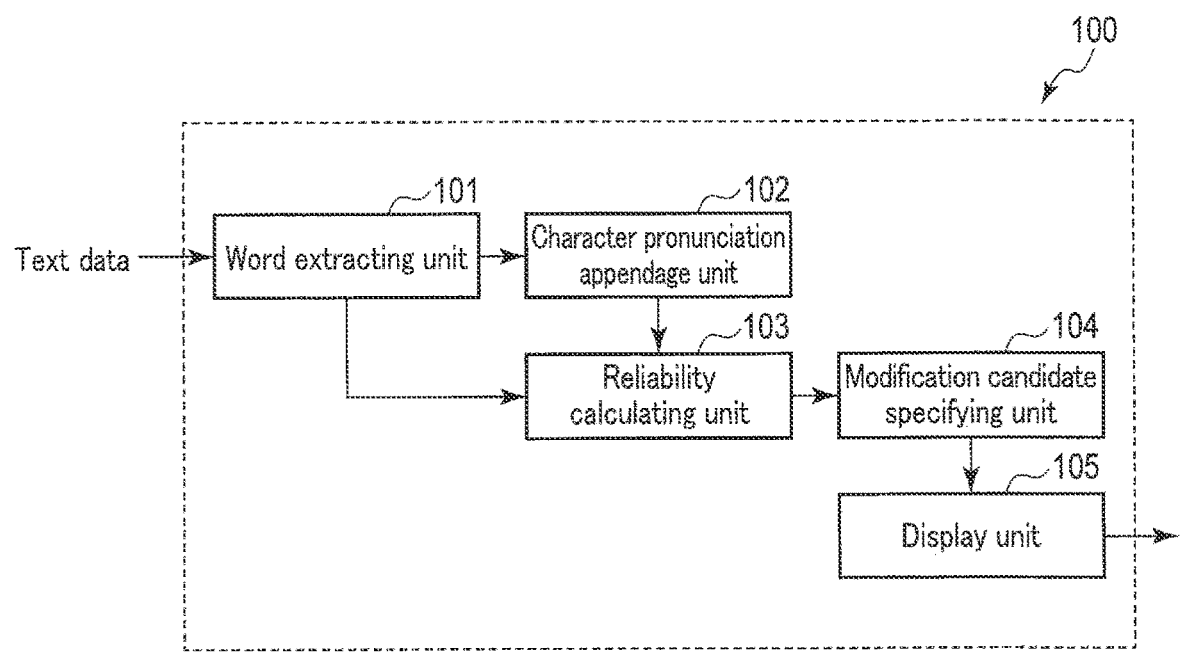
FIG. 1 is a block diagram showing a dictionary editing apparatus according to an embodiment.

Hereinafter, an embodiment will be described. FIG. 1 is a block diagram showing a dictionary editing apparatus according to an embodiment. A dictionary editing apparatus 100 includes a word extracting unit 101, a character pronunciation appendage unit 102, a reliability calculating unit 103, a modification candidate specifying unit 104, and a display unit 105. The dictionary editing apparatus 100 is an editing apparatus of the speech recognition dictionary. The speech recognition dictionary is a dictionary that stores character strings of words, character pronunciations of the words, and phonemes corresponding to the character pronunciations in association with each other.

The word extracting unit 101 extracts words from text data. The word extracting unit 101 sends the extracted words to the character pronunciation appendage unit 102 and the reliability calculating unit 103. The text data is, for example, text data related to a setting where the speech recognition dictionary may be used. A word may be configured of one or more morphemes. The word extracting unit 101 extracts words by performing morpheme analysis on text data. For example, the word extracting unit 101 divides text data into units of morphemes with reference to a morphological dictionary, and combines one or more morphemes obtained by the dividing to extract a word. At this time, the word extracting unit 101 extracts words that frequently occur in text data. Moreover, the word extracting unit 101 extracts compound nouns in which multiple nouns are joined. Furthermore, the word extracting unit 101 extracts, as technical terms, words that rarely occur in text data of other fields. Furthermore, the word extracting unit 101 extracts, as unknown words, words not included in a word dictionary with character pronunciations or a speech recognition dictionary. The word extracting unit 101 may statistically extract words by combining multiple word extraction approaches. For example, the word extracting unit 101 may extract, among the words not included in the speech recognition dictionary, words that frequently occur, compound nouns, and words that rarely occur in text data of other fields. The word extracting unit 101 may extract words through an existing word extraction method or any other approach.

The character pronunciation appendage unit 102 appends character pronunciations to words extracted by the word extracting unit 101. The character pronunciation appendage unit 102 sends the appended character pronunciations to the reliability calculating unit 103. Referring to, for example, the word dictionary with character pronunciation, if the extracted word is registered in the word dictionary, the character pronunciation appendage unit 102 appends its character pronunciation as it is. If the extracted word is a combination of multiple words registered in the word dictionary, the character pronunciation appendage unit 102 appends its character pronunciation by joining the character pronunciations of these words in view of sequential voicing, etc. The character pronunciation appendage unit 102 may learn character pronunciations of characters in advance with a large amount of data, and append character pronunciations to the extracted words using the learned results. The character pronunciation appendage unit 102 may append character pronunciations through an existing character pronunciation appendage method or any other approach.

The reliability calculating unit 103 performs at least one of calculation of a first reliability of a word extracted by the word extracting unit 101, or calculation of a second reliability of a character pronunciation appended by the character pronunciation appendage unit 102. The reliability calculating unit 103 sends at least one of the calculated first reliability and second reliability to the modification candidate specifying unit 104.

When, for example, morpheme analysis is performed by a statistical approach, the reliability calculating unit 103 may calculate the first reliability using scores of morphemes obtained by morpheme analysis. When, for example, words are extracted in such a manner that the sum of the scores becomes high, the reliability calculating unit 103 calculates the first reliability in such a manner that the higher the sum of the scores, the higher the value of the first reliability. The first reliability may be adjusted in text data in accordance with words existing on the periphery of an extracted word. When, for example, the extracted word is an alphabetical or numerical string, and the words before and after the extracted word similarly include an alphabetical or numerical character, there is a possibility that the extracted word and the alphabetical or numerical character on the periphery thereof together constitute a single word. Accordingly, the reliability calculating unit 103 may calculate the first reliability to have a value lower than the original value for an alphabetical or numerical string including an alphabetical or numerical character before or after the string. Similarly, when the extracted word is a noun and the word before or after the extracted word is also a noun, there is a possibility that the extracted word and a word on the periphery thereof will constitute a single compound noun. Accordingly, for such a word consisting of multiple nouns, the reliability calculating unit 103 may calculate the first reliability to have a value lower than the original value.

When text data is originally generated by another application, a line feed may be inserted in the middle of a word due to restrictions, etc. in the display range. In such a case, since there is a case where the sentences before and after the line feed may be connected in meaning, it is preferable to perform word extraction by connecting sentences before and after the line feed. Conversely, there is a case where an unnecessary word is extracted as a result of connecting fragments before and after the line feed that are discontinuous in meaning. Accordingly, the reliability calculating unit 103 may perform calculation to decrease the first reliability when a word is extracted from a portion including a line feed.

Alternatively, when the extracted word and the words before and after the extracted word are connected, and the word obtained by the connection is represented as both a combination of morphemes different from that before the connection and a combination of words registered in the dictionary, the reliability calculating unit 103 may recalculate the first reliability based on the scores of the different morphemes. Let us assume, for example, that, as a result of morpheme analysis, the word "'business completely automatic' (gyömu kanzen jidö 業務完全自動)" is divided into two words, "'business completion' (gyömu kan 業務完)" and "'full automatic' (zen jidö 全自動)", under the influence of peripheral words. The word "'business completion' (gyömu kan 業務完)" is a word that does not exist in the word dictionary with character pronunciations. On the other hand, when the word "'business completion' (gyömu kan 業務完)" is connected with its peripheral word "'full automatic' (zen jidö 全自動)", the word "'business completely automatic' (gyömu kanzen jidö 業務完全自動)" is obtained. When morpheme analysis is performed only on the word "'business completely automatic' (gyömu kanzen jidö 業務完全自動)", it is highly likely that it 業務完全自動 will be divided into three morphemes, namely, "'business' (gyömu 業務", "'complete' (kanzen 完全)", and "'automatic' (jidö 自動)". These morphemes are also words included in the word dictionary with character pronunciations. The scores of these morphemes at the time of performance of such morpheme analysis are considered to be high. Accordingly, the reliability calculating unit 103 may decrease the first reliability of "'business completion' (gyömu kan 業務完)" to be low.

Also, the reliability calculating unit 103 may calculate the second reliability in such a manner that the second reliability has a high value when the character pronunciation is appended based on the character pronunciations of the words included in the word dictionary with character pronunciations. On the other hand, when the appended character pronunciation is a character pronunciation appended based on a combination of multiple words included in the word dictionary with character pronunciations, the reliability calculating unit 103 may calculate the second reliability to have a value lower than the value of the character pronunciation appended based on each word. Moreover, when the appended character pronunciation is a character pronunciation not appended based on the words included in the word dictionary with character pronunciations, the reliability calculating unit 103 may calculate the second reliability to have a value lower than the value of the character pronunciation appended based on multiple words included in the word dictionary. When a character pronunciation is statistically appended, a score obtained in accordance with the character pronunciation appendage may be used as a second reliability. Alternatively, the reliability calculating unit 103 may uniformly decrease the value of the second reliability, since it is difficult to append character pronunciations to words with alphabetical or numerical characters.

Based on the reliability calculated by the reliability calculating unit 103, the modification candidate specifying unit 104 specifies a word and a character pronunciation to be a modification candidate. The modification candidate specifying unit 104 sends information on the word and character pronunciation to be a modification candidate to the display unit 105. The modification candidate specifying unit 104 may specify only one of the word or character pronunciation to be a modification candidate. As a concrete specification method, the modification candidate specifying unit 104 may specify a word with a first reliability that falls below the threshold value and a character pronunciation with a second reliability that falls below the threshold value as modification candidates. The threshold value of the first reliability and the threshold value of the second reliability may be either equal or not. Alternatively, the modification candidate specifying unit 104 may be configured to specify, when there is a word with a first reliability that falls below a threshold value, the character pronunciation of the word as a modification candidate, and specify, when there is a character pronunciation with a second reliability that falls below a threshold value, the word with that character pronunciation as a modification candidate. The modification candidate specifying unit 104 may be configured to specify a word and its character pronunciation as a modification candidate only when both the first reliability and the second reliability fall below a threshold value.

The display unit 105 may highlight the word or character pronunciation to be a modification candidate specified by the modification candidate specifying unit 104 on a display screen.

In the example of FIG. 1, the processing is performed in the order of word extraction, character pronunciation appendage, and reliability calculation. On the other hand, word extraction may be performed after character pronunciation appendage, and reliability calculation may be performed in parallel with word extraction and character pronunciation appendage. The first reliability, which indicates a reliability of a word, may be used for calculation of a second reliability, which is a reliability of a character pronunciation; conversely, the second reliability may be used for calculation of the first reliability.

Figure 2:
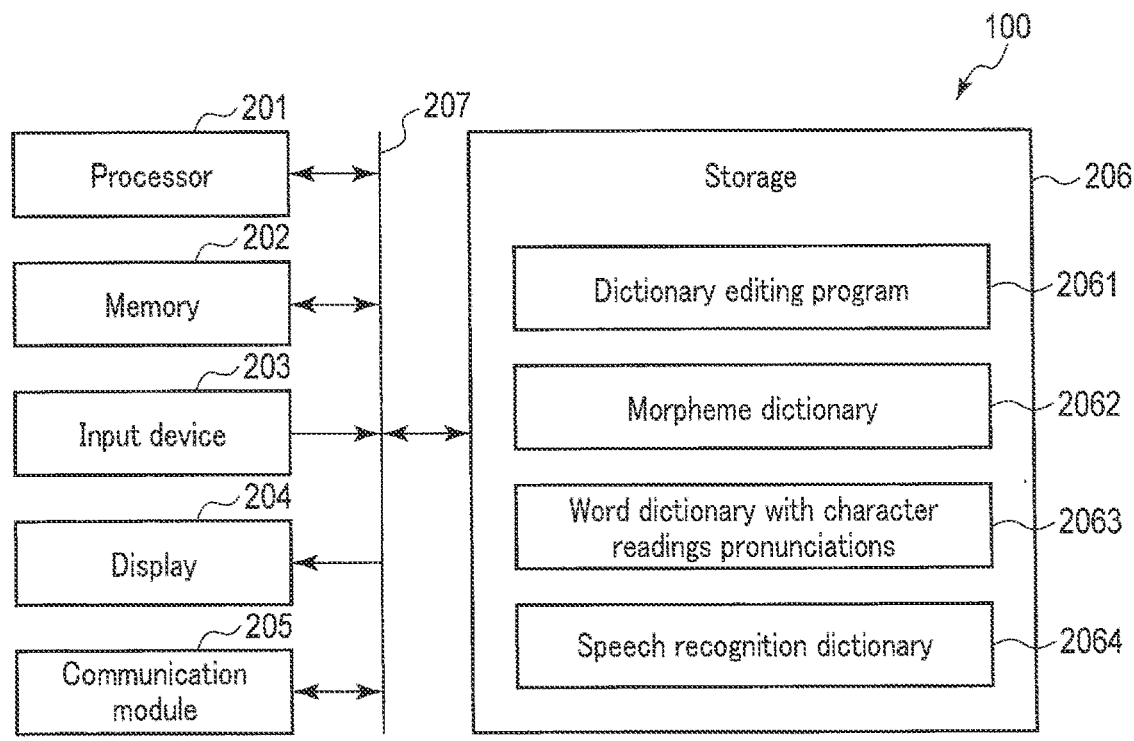
FIG. 2 is a diagram showing an example of a hardware configuration of the dictionary editing apparatus.

FIG. 2 is a diagram showing an example of a hardware configuration of the dictionary editing apparatus 100. The dictionary editing apparatus 100 includes, for example, a processor 201, a memory 202, an input device 203, a display 204, a communication module 205, and a storage 206 as hardware. The processor 201, the memory 202, the input device 203, the display 204, the communication module 205, and the storage 206 are coupled to a bus 207. The dictionary editing apparatus 100 may be a terminal device such as a personal computer (PC), a smartphone, or a tablet terminal.

The processor 201 is a processor that controls the entire operation of the dictionary editing apparatus 100. By executing, for example, a dictionary editing program stored in the storage 206, the processor 201 operates as the word extracting unit 101, the character pronunciation appendage unit 102, the reliability calculating unit 103, the modification candidate specifying unit 104, and the display unit 105. The processor 201 is, for example, a CPU. The processor 201 may be, for example, an MPU, a GPU, an ASIC, an FPGA, etc. The processor 201 may be a single CPU, etc., or may be multiple CPUs, etc.

The memory 202 includes a ROM and a RAM. The ROM is a non-volatile memory. The ROM stores an activation program, etc. of the dictionary editing apparatus 100. The RAM is a volatile memory. The RAM is used as, for example, a working memory during the processing at the processor 201.

The input device 203 is an input device such as a touch panel, a keyboard, a mouse, etc. When an operation is made via the input device 203, a signal corresponding to details of the operation is input via the bus 207 to the processor 201. The processor 201 performs various processes in response to the signal. The input device 203 may be used for registration of a word in a dictionary and a modification thereof.

The display 204 is a display device such as a liquid crystal display, an organic EL display, etc. The display 204 displays various types of images.

The communication module 205 is a communication device that allows the dictionary editing apparatus 100 to communicate with an external device. The communication module 205 may be either a communication device for wired communications, or a communication device for wireless communications.

The storage 206 is a storage such as a flash memory, a hard disk drive, a solid-state drive, etc. The storage 206 stores various types of programs executed by the processor 201, such as a dictionary editing program 2061. The storage 206 stores a morpheme dictionary 2062. The morpheme dictionary 2062 is, for example, a dictionary that stores character strings denoting morphemes and parts of speech of the morphemes in association with each other. The storage 206 stores a word dictionary with character pronunciations 2063.

The word dictionary with character pronunciations is a dictionary in which character strings denoting words and character pronunciations of the words are stored in association with each other. The storage 206 stores a speech recognition dictionary 2064. The morpheme dictionary 2062, the word dictionary with character pronunciations 2063, and the speech recognition dictionary 2064 need not necessarily be stored in the storage 206. For example, the morpheme dictionary 2062, the word dictionary with character pronunciations 2063, and the speech recognition dictionary 2064 may be stored in a server outside the dictionary editing apparatus 100. In this case, the dictionary editing apparatus 100 acquires necessary information by accessing the server using the communication module 205.

The bus 207 is a data transfer path for exchanging data with the processor 201, the memory 202, the input device 203, the display 204, the communication module 205, and the storage 206.

Figure 3:
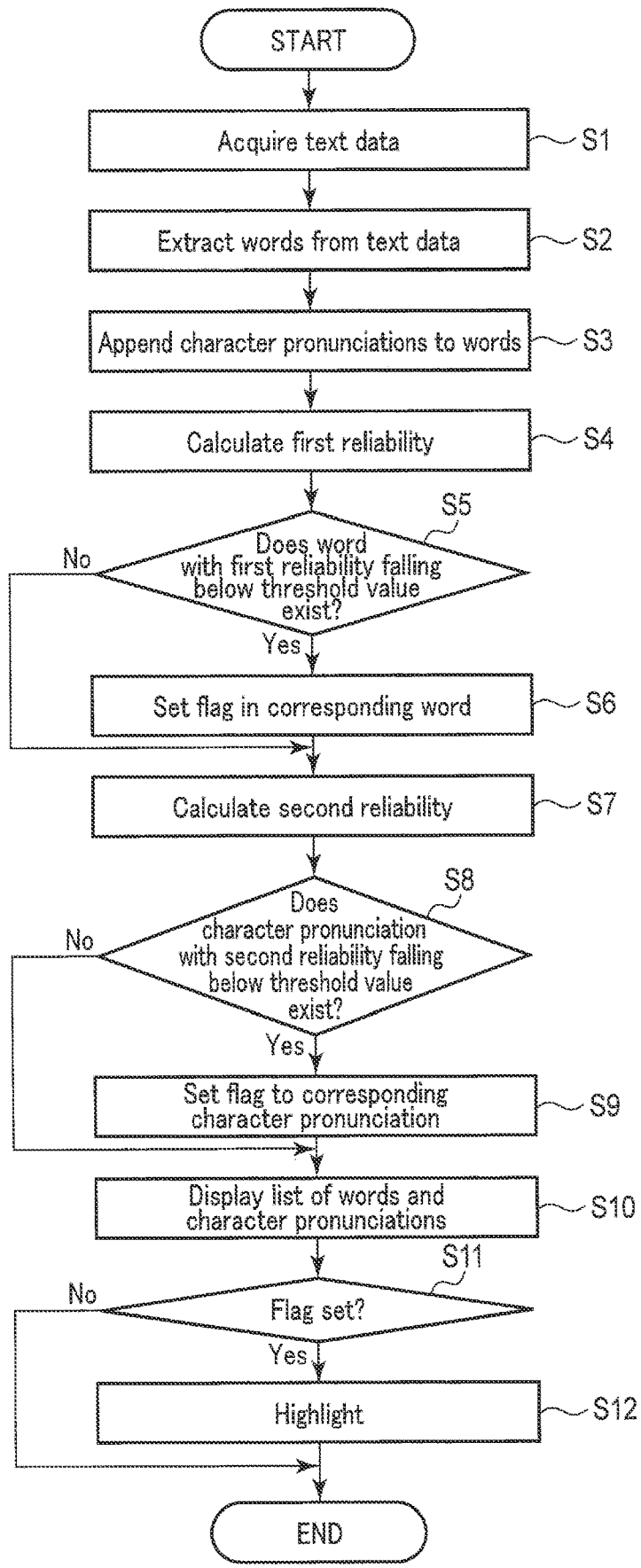
FIG. 3 is a flowchart showing an operation of the dictionary editing apparatus.

Next, an operation of the dictionary editing apparatus 100 will be described. FIG. 3 is a flowchart showing an operation of the dictionary editing apparatus 100. The processing of FIG. 3 is executed by the processor 201.

At step S1, the processor 201 acquires text data. The text data may be input by, for example, a user of the dictionary editing apparatus 100. Alternatively, text data may be input by reading text printed on a paper sheet through image recognition, etc. In this manner, acquisition of text data is not limited to a particular approach.

At step S2, the processor 201 extracts words from text data. The processor 201 divides text data into units of morphemes with reference to the morpheme dictionary 2062, and extracts words by combining one or more morphemes obtained by the dividing.

At step S3, the processor 201 appends character pronunciations to the extracted words. The processor 201 appends character pronunciations to the respective words with reference to the word dictionary with character pronunciations 2063.

At step S4, the processor 201 calculates a first reliability denoting a reliability of a word. For example, the processor 201 calculates a first reliability using scores of morphemes obtained by the morpheme analysis. The processor 201 adjusts the value of the first reliability in accordance with the relationship between the extracted words and the words that exist on the periphery thereof.

At step S5, the processor 201 determines whether there is a word with a first reliability that falls below a threshold value. When it is determined at step S5 that there is a word with a first reliability that falls below the threshold value, the processing shifts to step S6. When it is determined at step S5 that there are no words with a first reliability that falls below the threshold value, the processing shifts to step S7.

At step S6, the processor 201 sets a flag to a word corresponding to the first reliability that falls below the threshold value. This flag is a flag indicating that the extracted word is a modification candidate. Thereafter, the processing shifts to step S7.

At step S7, the processor 201 calculates a second reliability denoting a reliability of a character pronunciation. For example, the processor 201 calculates a second reliability based on whether a character pronunciation has been appended based on a word registered in the word dictionary with character pronunciations 2063.

At step S8, the processor 201 determines whether or not there is a character pronunciation with a second reliability that falls below a threshold value. When it is determined at step S8 that there is a character pronunciation with a second reliability that falls below the threshold value, the processing shifts to step S9. When it is determined at step S8 that there is no character pronunciations with a second reliability that falls below the threshold value, the processing shifts to step S10.

At step S9, the processor 201 sets a flag to a character pronunciation with a second reliability that falls below the threshold value. This flag is a flag indicating that the appended character pronunciation is a modification candidate. Thereafter, the processing shifts to step S10.

At step S10, the processor 201 displays, on the display 204, a list of newly extracted words and their character pronunciations in a tabular form, for example.

At step S11, the processor 201 determines whether or not there is a word or character pronunciation to which a flag is set. At step S11, when it is determined that there are no words or character pronunciations to which a flag is set, the processing of FIG. 3 ends. In this case, when registration of a word and its character pronunciation is instructed by an operation via the input device 203 by a user, the processor 201 registers the newly extracted word and its character pronunciation in association with phonemes in the speech recognition dictionary 2064. When editing of a word and its character pronunciation is instructed by an operation via the input device 203 by a user, the processor 201 modifies the newly extracted word and its character pronunciation according to an operation by the user, and registers them in the speech recognition dictionary 2064. At step S11, when it is determined that there is a word or character pronunciation to which a flag is set, the processing shifts to step S12.

At step S12, the processor 201 highlights a word or character pronunciation to which a flag is set. Thereafter, the processing of FIG. 3 ends. In this case, when registration of a word and its character pronunciation is instructed by an operation via the input device 203 by a user, the processor 201 registers the newly extracted word and its character pronunciation in association with phonemes in the speech recognition dictionary 2064. When editing of a word and its character pronunciation is instructed by an operation via the input device 203 by a user, the processor 201 modifies the newly extracted word and its character pronunciation according to an operation by the user, and registers them in the speech recognition dictionary 2064.

Figure 4:
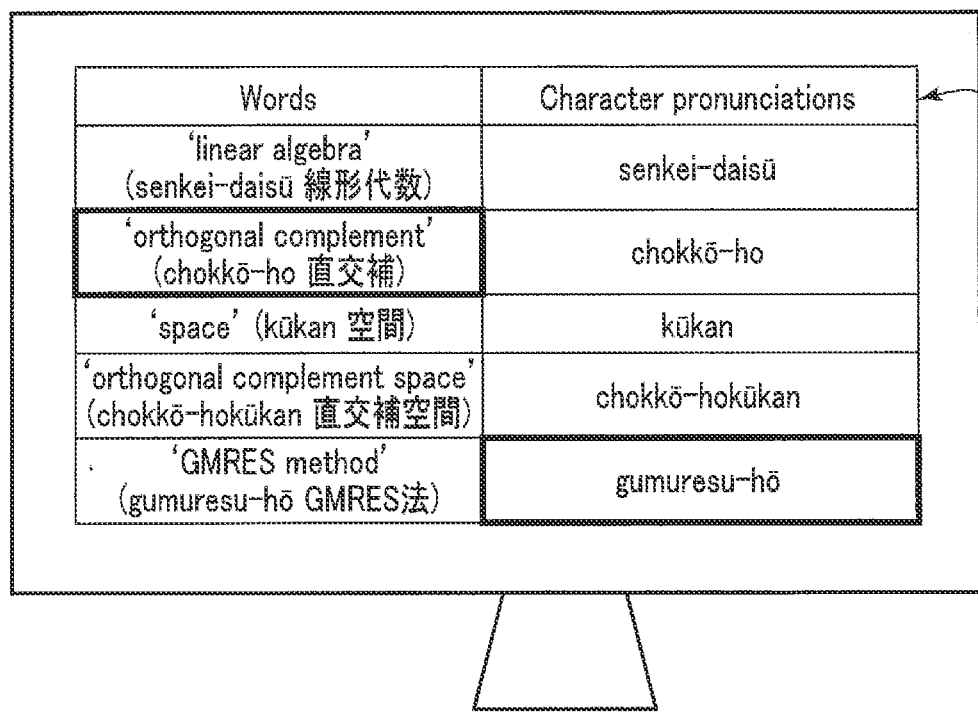
FIG. 4 is a diagram showing an example of highlighting.

The highlighting at step S12 will be described. FIG. 4 is a diagram showing an example of highlighting. FIG. 4 shows an example in which word extraction and character pronunciation appendage are performed on text data pf text regarding linear algebra. Through the processing at step S10, a table 2041 of the extracted words and its character pronunciations is displayed on the display screen of the display 204. A word or character pronunciation with a low reliability, among those in the table 2041, is highlighted.

For example, the word "'orthogonal complement' (chokkö-ho 直交補)" is part of the word "'orthogonal complement space' (chokkö-hokükan 直交補空間)" in linear algebra. That is, "'orthogonal complement' (chokkö-ho 直交補)" is a word that remains after "'space' (kükan 空間)" is 空間 extracted based on the context. On the other hand, if morpheme analysis were performed on "'orthogonal complement space' (chokkö-hokükan 直交補空間)" again, it may be divided into "'orthogonal' (chokkö 直交)" and "'complement space' (ho-kükan 補空間)", and it could be seen that "'orthogonal complement' (chokkö-ho 直交補)" is highly likely to be part of "'orthogonal complement space' (chokkö-hokükan 直交補空間)". Accordingly, the first reliability of the word "'orthogonal complement' (chokkö-ho 直交補)" is decreased. As a result, the word "'orthogonal complement' (chokkö-ho 直交 補)" is highlighted. In FIG. 4, the cell in which the word "'orthogonal complement' (chokkö-ho 直交補)" is displayed is displayed with bold framing. On the other hand, the character pronunciation "chokkö-ho ちょっこうほ" need not be highlighted, since it has been appended based on the character pronunciations of the words included in the word dictionary with character pronunciations. As described above, since the first reliability of the corresponding word is determined to be low, the character pronunciation "chokkö-ho ちょっこうほ" may also be highlighted. In FIG. 4, the newly extracted word "'orthogonal complement space' (chokkö-hokükan 直交補空間)" and its character pronunciation "chokkö-hokükan ちょっこうほくうかん" are also displayed. The display of the newly extracted word and its character pronunciation may be omitted.

Also, the character pronunciation "gumuresu-hö ぐむれすほう" is a character pronunciation of the word "'GMRES method' (gumuresu-hö GMRES法)", which denotes the generalized minimal residual method. Since the word "'GMRES method' (gumuresu-hö GMRES法)" is a word configured of an alphabetical string, its character pronunciation "gumuresu-hö ぐむれすほう" is highlighted in the table 2041. The word "'GMRES method' (gumuresu-hö GMRES法)" would be similarly extracted if morpheme analysis were performed again. Accordingly, the word "'GMRES method' (gumuresu-hö GMRES法)" need not be highlighted. As described above, since the second reliability of the corresponding character pronunciation is determined to be low, the word "'GMRES method' (gumuresu-hö GMRES法)" may also be highlighted.

In the example of FIG. 4, highlighting is performed by displaying, with bold framing, a cell in which a word or character pronunciation to be a modification candidate is displayed. The highlighting is not limited thereto. For example, a change may be made to the background color of the cell, the color of the frame of the cell, the size of the cell, etc. Also, a change may be made to the color of the characters of the cell, the font (including character font, bolding, italicizing, underlining, etc.), etc., or the size of the characters may be increased. Moreover, a change may be made to the thickness, color, etc. of the frame of the cell according to the magnitude of the value of the reliability. Furthermore, highlighting may be performed by using them in combination.

Also, the table 2041 may display not only the words and their character pronunciations, but also the values of their reliabilities.

As described above, according to the embodiment, a reliability is calculated for each of the word automatically extracted from text data and the automatically appended character pronunciation, and the word or character pronunciation to be a modification candidate is specified based on the reliability. By presenting, to the user, the word or character pronunciation to be a modification candidate based on such a specification result, it becomes possible for the user to perform a check with an emphasis on the word or character pronunciation to be a modification candidate. This allows the user to easily perform a check operation and a modification operation.

In the present embodiment, it is assumed that the dictionary editing apparatus 100 includes a word extracting unit 101, a character pronunciation appendage unit 102, a reliability calculating unit 103, a modification candidate specifying unit 104, and a display unit 105. However, the dictionary editing apparatus 100 need not necessarily include all of these. For example, the dictionary editing apparatus 100 need not include the word extracting unit 101 and the character pronunciation appendage unit 102. In this case, the dictionary editing apparatus 100 acquires information necessary for calculating the reliability, in addition to the extracted word and the appended character pronunciation. The information necessary for calculating the reliability is, for example, a score of each morpheme calculated in accordance with morpheme analysis. The dictionary editing apparatus 100 calculates a first reliability and a second reliability based on information necessary for calculating the reliability. The dictionary editing apparatus 100 need not include the display unit 105. In this case, the dictionary editing apparatus 100 may be configured to externally output information on the specified word and character pronunciation to be a modification candidate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A dictionary editing apparatus comprising a processor with hardware, the processor being configured to:
    extract a word from text data;
    append a character pronunciation to the extracted word;
    calculate a first reliability denoting a reliability of the extracted word based on scores of morphemes obtained by morpheme analysis and a second reliability denoting a reliability of the appended character pronunciation based on a score obtained in accordance with a character pronunciation appendage;
    specify a word to be a modification candidate in accordance with the first reliability; and
    specify a character pronunciation to be a modification candidate in accordance with the second reliability,
    wherein the processor calculates the first reliability according to whether the extraction of the word has been performed based on a character string with a line feed by connecting characters before and after the line feed in the text data.

2. The dictionary editing apparatus according to claim 1, wherein the processor calculates the first reliability using information on a word that exists on a periphery of the extracted word in the text data.

3. The dictionary editing apparatus according to claim 1, wherein the processor calculates the second reliability using at least one of: whether the character pronunciation has been appended based on a word registered in a dictionary for performing character pronunciation appendage; whether the character pronunciation has been appended based on multiple words registered in the dictionary; or whether the word to which the character pronunciation has been appended includes a numerical or alphabetical character.

4. The dictionary editing apparatus according to claim 1, wherein the processor displays, on a display, the extracted word and character pronunciation to the extracted word, and highlights the specified word or character pronunciation to be a modification candidate.

5. The dictionary editing apparatus according to claim 4, wherein the processor performs the highlighting by changing at least one of: a background color of a cell in which a word or character pronunciation to be the modification candidate is displayed; a thickness of a frame of the cell; a size of the frame of the cell; a color of the frame of the cell; a color of characters displayed in the cell; a font of the characters; or a size of the characters.

6. A dictionary editing method, comprising:
    extracting a word from text data;
    appending a character pronunciation to the extracted word;
    calculating a first reliability denoting a reliability of the extracted word based on scores of morphemes obtained by morpheme analysis and a second reliability denoting a reliability of the appended character pronunciation based on a score obtained in accordance with a character pronunciation appendage;
    specifying a word to be a modification candidate in accordance with the first reliability; and
    specifying a character pronunciation to be a modification candidate in accordance with the second reliability,
    wherein the first reliability is calculated according to whether the extraction of the word has been performed based on a character string with a line feed by connecting characters before and after the line feed in the text data.

7. A computer-readable, non-transitory recording medium recording thereon a dictionary editing program for causing a processor to execute:
    extracting a word from text data;
    appending a character pronunciation to the extracted word;
    calculating a first reliability denoting a reliability of the extracted word based on scores of morphemes obtained by morpheme analysis and a second reliability denoting a reliability of the appended character pronunciation based on a score obtained in accordance with a character pronunciation appendage;
    specifying a word to be a modification candidate in accordance with the first reliability; and
    specifying a character pronunciation to be a modification candidate in accordance with the second reliability,
    wherein the first reliability is calculated according to whether the extraction of the word has been performed based on a character string with a line feed by connecting characters before and after the line feed in the text data.

* * * * *